United States Patent
Tsujimoto et al.

(10) Patent No.: US 9,199,598 B2
(45) Date of Patent: Dec. 1, 2015

(54) AIRBAG AND AIRBAG APPARATUS

(71) Applicant: TAKATA CORPORATION, Tokyo (JP)

(72) Inventors: Kei Tsujimoto, Shiga (JP); Hideki Umeda, Shiga (JP); Yoshiyuki Yamamoto, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/628,794

(22) Filed: Feb. 23, 2015

(65) Prior Publication Data

US 2015/0239415 A1    Aug. 27, 2015

(30) Foreign Application Priority Data

Feb. 26, 2014  (JP) ................ 2014-035106

(51) Int. Cl.
*B60R 21/20* (2011.01)
*B60R 21/217* (2011.01)
*B60R 21/232* (2011.01)

(52) U.S. Cl.
CPC .............. *B60R 21/20* (2013.01); *B60R 21/217* (2013.01); *B60R 21/232* (2013.01)

(58) Field of Classification Search
CPC ...... B60R 21/20; B60R 21/232; B60R 21/217
USPC .......................................... 280/728.2, 730.2
See application file for complete search history.

(56) References Cited

U.S. PATENT DOCUMENTS

| | | | |
|---|---|---|---|
| 7,097,200 B2* | 8/2006 | Wold | 280/730.2 |
| 7,478,826 B2* | 1/2009 | Soderquist et al. | 280/728.2 |
| 7,766,369 B2 | 8/2010 | Bradburn et al. | |
| 2010/0327564 A1* | 12/2010 | Cheal | 280/728.2 |
| 2011/0042923 A1* | 2/2011 | Hatfield et al. | 280/730.2 |

FOREIGN PATENT DOCUMENTS

| | | |
|---|---|---|
| JP | 3608524 B2 | 1/2005 |
| JP | 3941514 B2 | 7/2007 |
| JP | 2013-006539 A | 1/2013 |
| JP | 2013-173403 A | 9/2013 |
| JP | 5334155 B2 | 11/2013 |
| WO | 2012/176732 A1 | 12/2012 |

* cited by examiner

*Primary Examiner* — Faye M Fleming
(74) *Attorney, Agent, or Firm* — Fitch Even Tabin & Flannery LLP

(57) ABSTRACT

An airbag includes a tab that is inserted into and supported by a substantially flat-plate-shaped bracket disposed on a vehicle. The tab has a first slit extending along a direction substantially orthogonal to a direction of inflation and deployment of the airbag in plan view. The first slit allows insertion of the bracket in a normal time. The tab further has a second slit opening into a point at one end portion or on an intermediate portion of the first slit at an angle intersecting with the first slit in plan view.

5 Claims, 11 Drawing Sheets

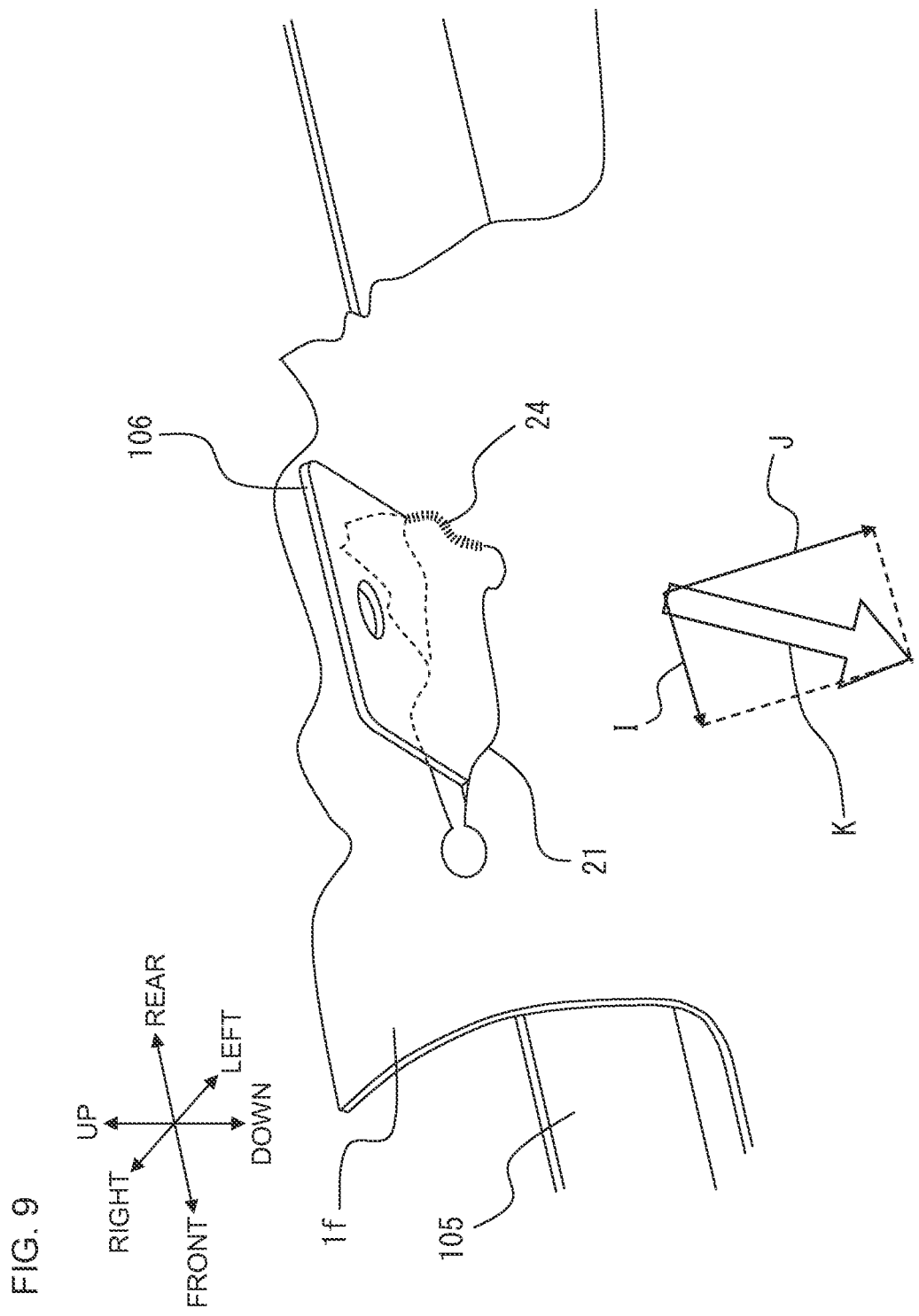

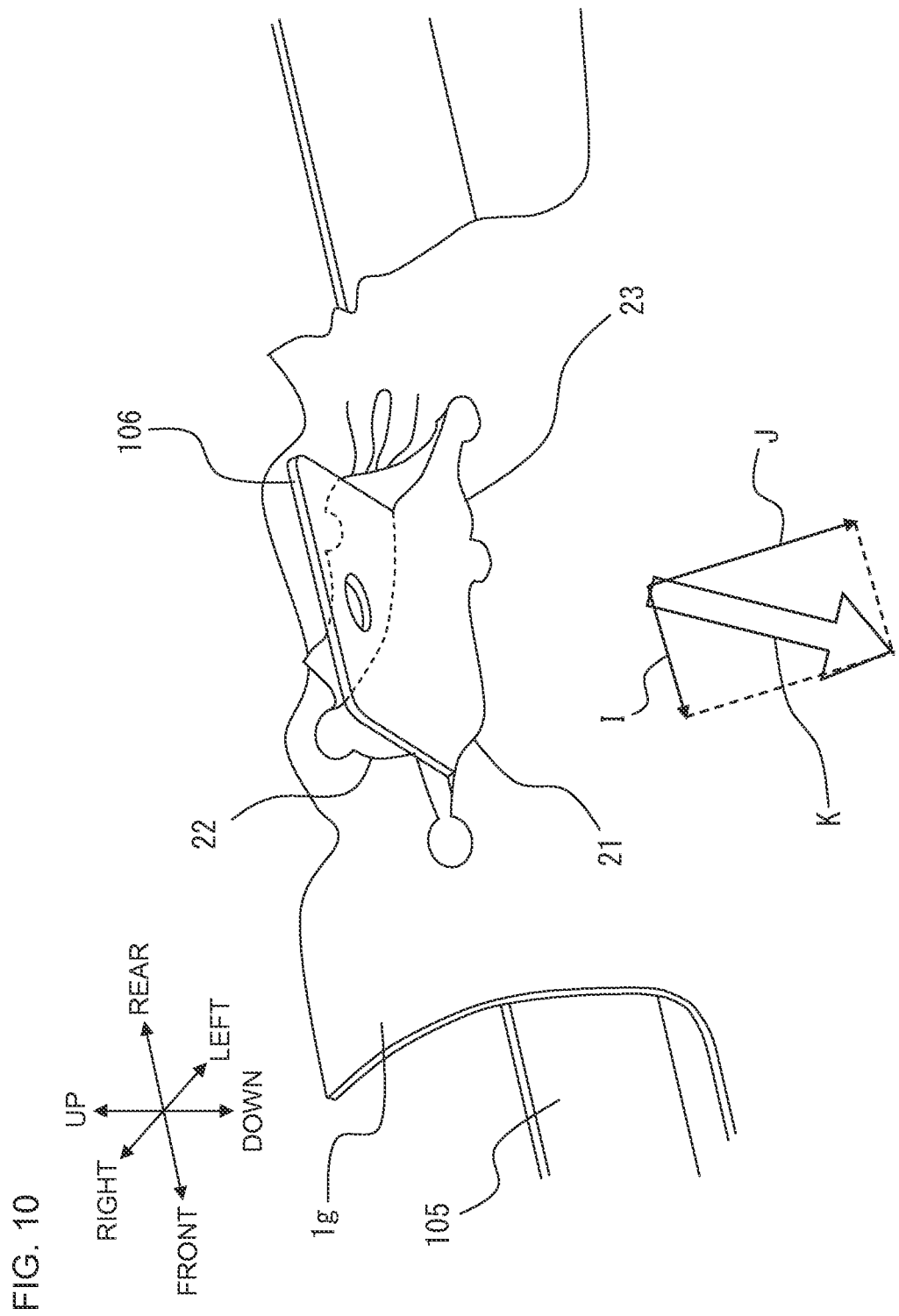

AIRBAG AND AIRBAG APPARATUS

CROSS-REFERENCE TO RELATED APPLICATION

This application is based upon and claims the benefit of priority from the prior Japanese Patent Application No. 2014-035106, filed on Feb. 26, 2014, the entire contents of which are incorporated herein by reference.

BACKGROUND OF THE INVENTION

1. Field of the Invention

The present invention relates to an airbag restraining a passenger and an airbag apparatus including the airbag.

2. Description of the Related Art

One of on-vehicle airbags is a curtain airbag that inflates and deploys downward along the sides of a vehicle body to restrain a passenger laterally (see, e.g., JP, A, 2013-6539).

The curtain airbag according to the prior art has a plurality of tabs along its upper edge, the tabs having their respective slits into which brackets of the vehicle body are respectively inserted so that the whole curtain airbag is locked to the vehicle body. In the normal time, the curtain airbag is housed in a casing portion above a pillar or a side window of the vehicle body. When gas is supplied from an inflator, the curtain airbag appears in the interior of a vehicle and inflates and deploys downward along the pillar or the side window.

To reduce the capacity of the casing portion, however, the inflator is often positioned substantially parallel to the longitudinal direction of the vehicle. As a result, gas is injected into the airbag mainly at a slant angle in the vehicle longitudinal direction (details thereof will hereinafter be described in an embodiment). For this reason, the tabs near the connection point with the inflator in particular are largely subjected to a load component along the vehicle longitudinal direction due to reception of gas injected mainly at a slant angle, in addition to a downward load arising from inflation and deployment of the curtain airbag. In the prior art, therefore, a reinforcement fabric folded a predetermined number of times is joined to the tabs to enhance the durability, which however results in a complicated structure and an increased cost.

SUMMARY OF THE INVENTION

An object of the present invention is to provide an airbag and an airbag apparatus, capable of improving the durability of tabs without disposing reinforcement fabrics.

In order to achieve the above-described object, according to the first invention, there is provided an airbag comprising a tab that is inserted into and supported by a substantially flat-plate-shaped bracket disposed on a vehicle, the tab having, in plan view, a first slit extending along a direction substantially orthogonal to a direction of inflation and deployment of the airbag, and allowing insertion of the bracket in a normal time, and a second slit that opens into a point at one end portion or on an intermediate portion of the first slit at an angle intersecting with the first slit.

According to a first invention, the tab has the first slit extending in a direction substantially orthogonal to the direction of inflation and deployment of the airbag, the first slit allowing insertion of the bracket in the normal time. The tab further has the second slit opening into the first slit at one end or a point on an intermediate portion of the first slit and at an angle intersecting with the first slit. Hence, an end opposite to the opening side of the second slit is apart from the first slit. When the heavy-duty attachment tab is drawn diagonally with respect to the direction of inflation and deployment by the combined load, portions of the base fabrics are turned up (or turned down) below the bend line extending from the end (the opposite end to the opening side) of the second slit up to the end of the first slit opposite to the combined load. When the face of the turned-up portions of the base fabrics receives the edge of the bracket, the stress can be distributed over all the wrinkles appearing therearound. In this manner, the tab implements a higher durability by only the arrangement of the slits in the base fabrics. As a result, the tab durability can be improved without disposing the reinforcement fabrics.

According to the second invention, in the airbag according to the first invention, the second slit extends at least on a side opposite to the direction of inflation and deployment with respect to the first slit.

With the arrangement of the second invention, the bend line can be disposed on a side opposite to the side of application of the combined load with respect to the first slit so that around the bend line the base fabrics can have wrinkles receiving the edge of the bracket.

According to the third invention, in the airbag according to the first invention, the second slit opens into the first slit at a point closer to a side of application of a load component to the tab along a direction of extension of the first slit at the time of inflation and deployment of the airbag.

With the arrangement of the third invention, the bend line positioned opposite to the application side of the combined load can be set longer so that wrinkles appearing therearound can be formed wider correspondingly to improve the durability of the tab.

According to the fourth invention, in the airbag according to the first invention, the first slit includes a third slit that extends from a range of insertion of the bracket in the normal time towards a side opposite to the side of application of a load component to the tab along the direction of extension of the first slit at the time of inflation and deployment of the airbag.

With the arrangement of the fourth invention, the bend line positioned opposite to the application side of the combined load can be set longer so that wrinkles appearing therearound can be formed wider correspondingly to improve the durability of the tab.

According to the fifth invention, there is provided an airbag apparatus comprising the airbag in the first invention and an inflator that supplies gas for inflation and deployment of the airbag into the interior of the airbag.

According to the present invention, the durability of tabs can be improved without disposing reinforcement fabrics.

BRIEF DESCRIPTION OF THE DRAWINGS

FIG. 9 is a perspective view, showing an external appearance, of the case where a diagonally frontward and downward combined load is applied to the structure of locking between the attachment tab having only the first slit and the bracket disposed on the vehicle body.

FIG. 10 is a perspective view, showing an external appearance, of the case where a diagonally frontward and downward combined load is applied to the structure of locking between the heavy-duty attachment tab and the bracket disposed on the vehicle body.

DESCRIPTION OF THE PREFERRED EMBODIMENTS

An airbag apparatus including an airbag according to an embodiment of the present invention will now be described with reference to the accompanying drawings. Description of this embodiment is given of an example in which the present invention is applied to a curtain airbag apparatus disposed at the side of a vehicle. In the following description, the vehicle longitudinal direction refers to a front-to-rear direction of a vehicle when viewed from seated passengers.

Figure 1:
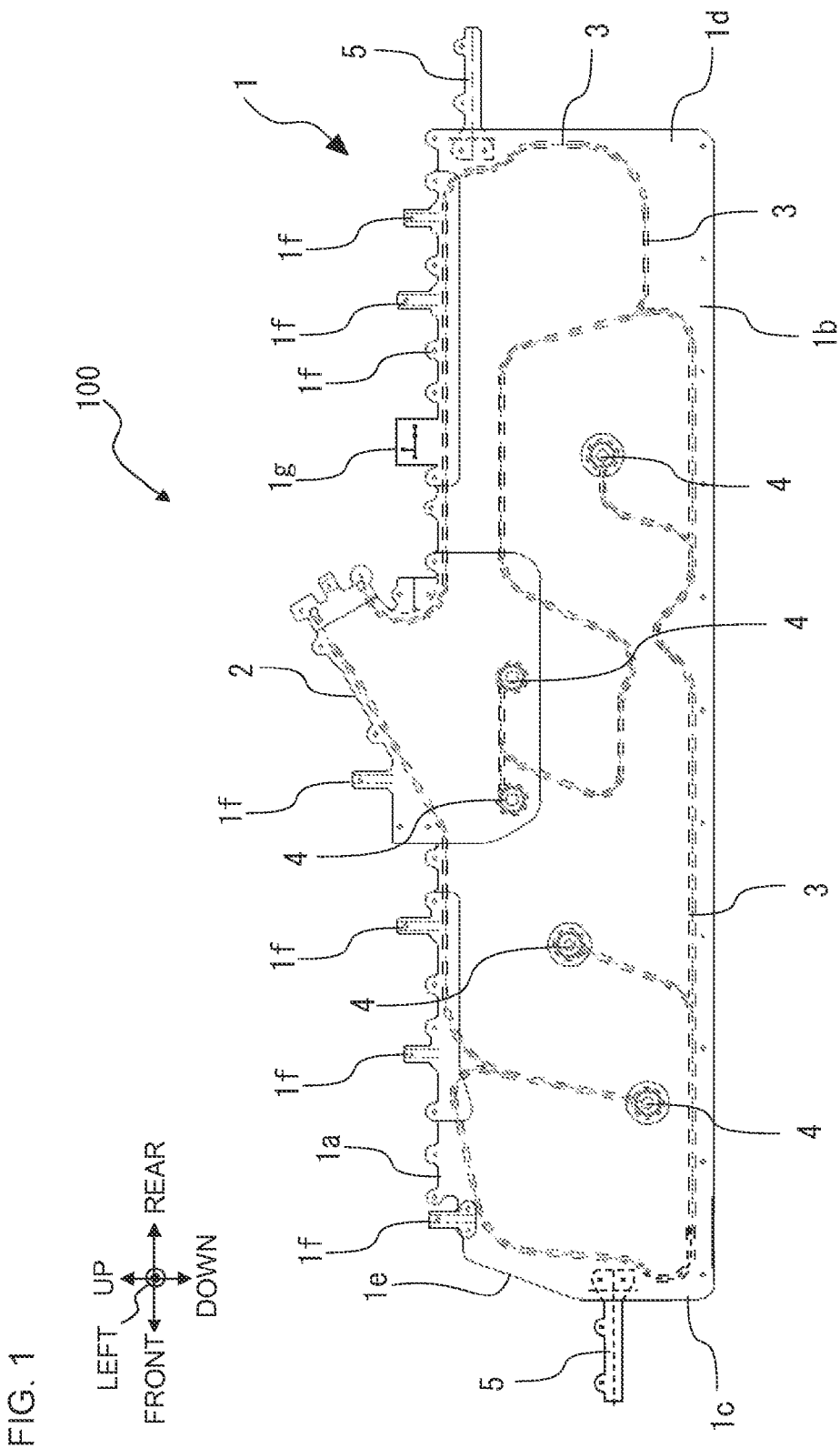
FIG. 1 is a side view of a curtain airbag according to an embodiment of the present invention.

FIG. 1 is a side view of the curtain airbag of this embodiment in the deployed status, with its internal structure shown in an opened-up manner.

Referring to FIG. 1, a curtain airbag generally designated by 100 (corresponding to the airbag) of this embodiment includes an airbag body generally designated by 1. The airbag body 1 has a length enough to inflate over a wide range from the front to the rear of a vehicle body generally designated by 101 (see FIG. 4 which will be described later) and a height enough to inflate over a range from a ceiling of the vehicle body 101 through a passenger's head to a shoulder thereof. The airbag body 1 is formed into a substantial rectangle having an upper edge 1a, a lower edge 1b, a front end 1c, and a rear end 1d. The upper edge 1a and the lower edge 1b are long sides extending in a direction along the vehicle body longitudinal direction. The front end 1c and the rear end 1d are short sides extending in a direction along the vertical direction of the vehicle body 101. In the front end 1c at the front of the vehicle body 101, the airbag body 1 has for example an inclined portion 1e that is inclined in front-low and rear-high so as to conform to the vehicle body shape. The inclined portion 1e need not necessarily be disposed taking into consideration the relationships with the vehicle body shape (e.g., the shape and angle of front pillars and the size of the airbag body 1).

The airbag body 1 has a pressure gas introducing portion 2 integrally formed therewith near the middle of the upper edge 1a. The airbag body 1 has a sewn portion 3 and a circular sewing 4. The sewn portion 3 defines the inflation order and the introduction direction of pressure gas introduced through the introducing portion 2, to thereby swell and inflate to a thickness restraining the passengers seated at the front and the rear of the vehicle body 101.

Figure 2:
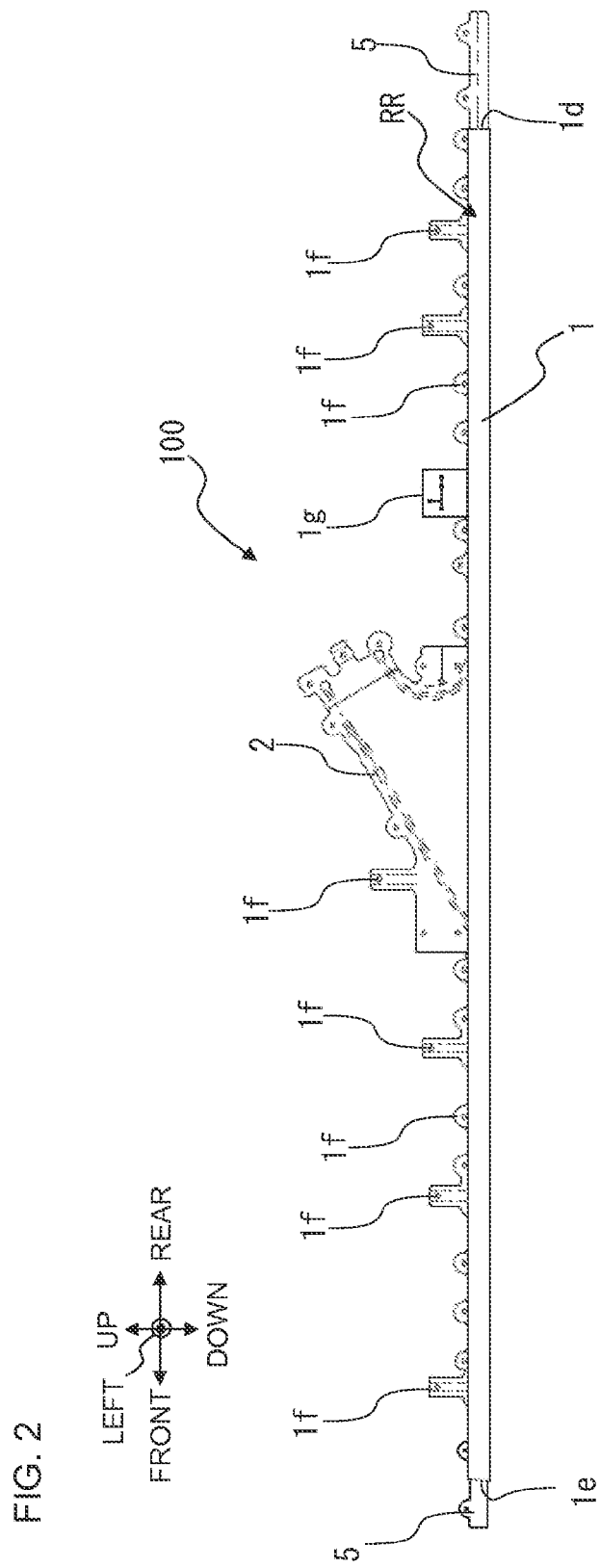
FIG. 2 is a view showing an airbag body rolled up into a roll.

The airbag body 1 has, along the upper edge 1a, a plurality of attachment tabs 1f, 1g fitted by e.g., sewing to the upper edge 1a of the airbag body 1. The airbag body 1 is attached via the plurality of attachment tabs 1f, 1g to the vehicle body 101 along its longitudinal direction. At or near the middle of the front end 1c in its height direction, the airbag body 1 has a substantially belt-shaped tether 5 whose base end is fitted by e.g., sewing to the airbag body 1. Also in the vicinity of the top of the rear end 1d in its height direction, the airbag body 1 has the substantially belt-shaped tether 5 whose base end is fitted by e.g., sewing to the airbag body 1. Each of the tethers 5 may be fitted to the airbag body 1 by sewing, etc., or may be integrated into the airbag body 1. In this embodiment, such an airbag body 1 is rolled up in sequence from the lower edge 1b toward the upper edge 1a into a cylindrical shape to form a roll RR as shown in FIG. 2.

Figure 3:
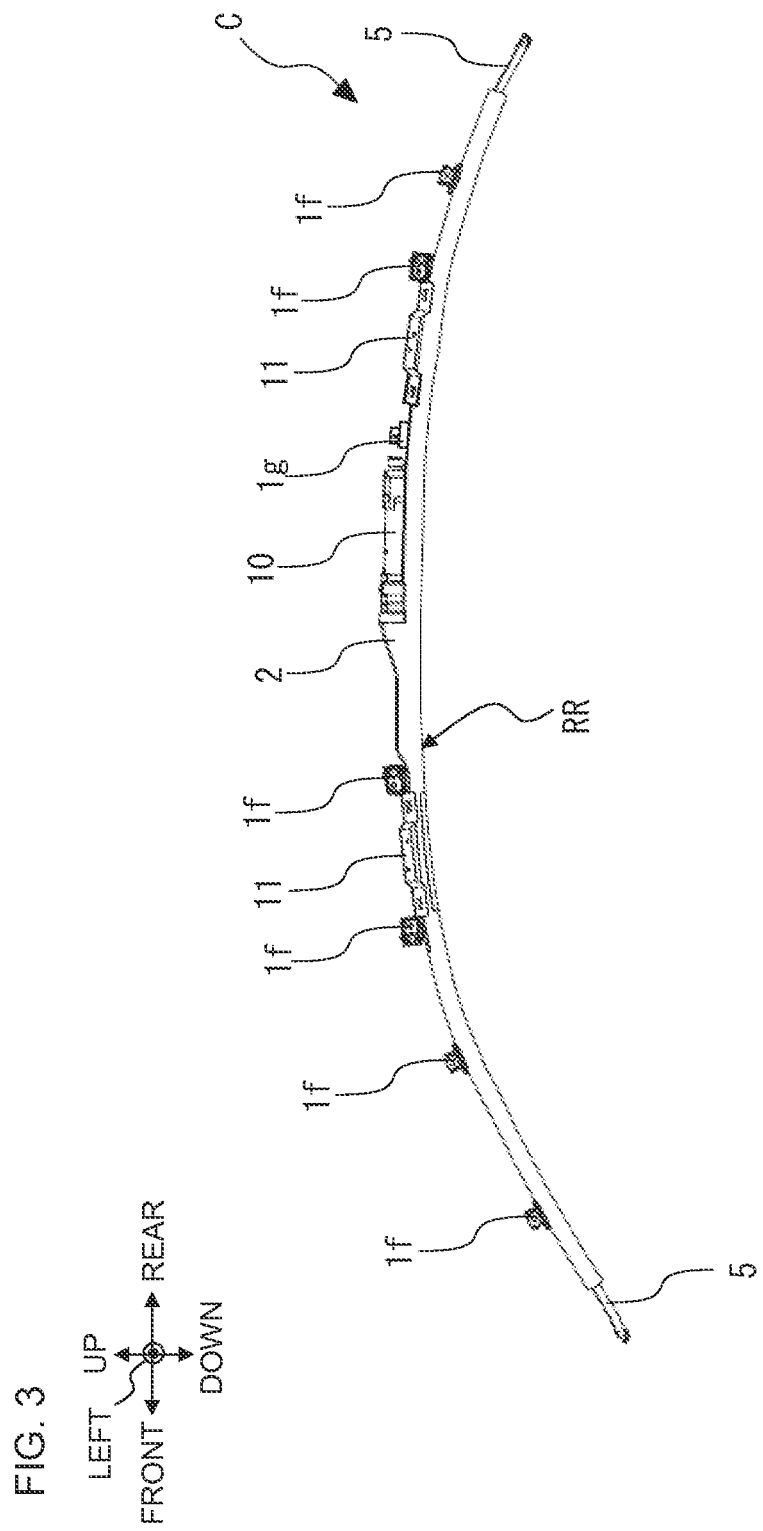
FIG. 3 is an external view of the airbag body when attached to a vehicle body.
Figure 4:
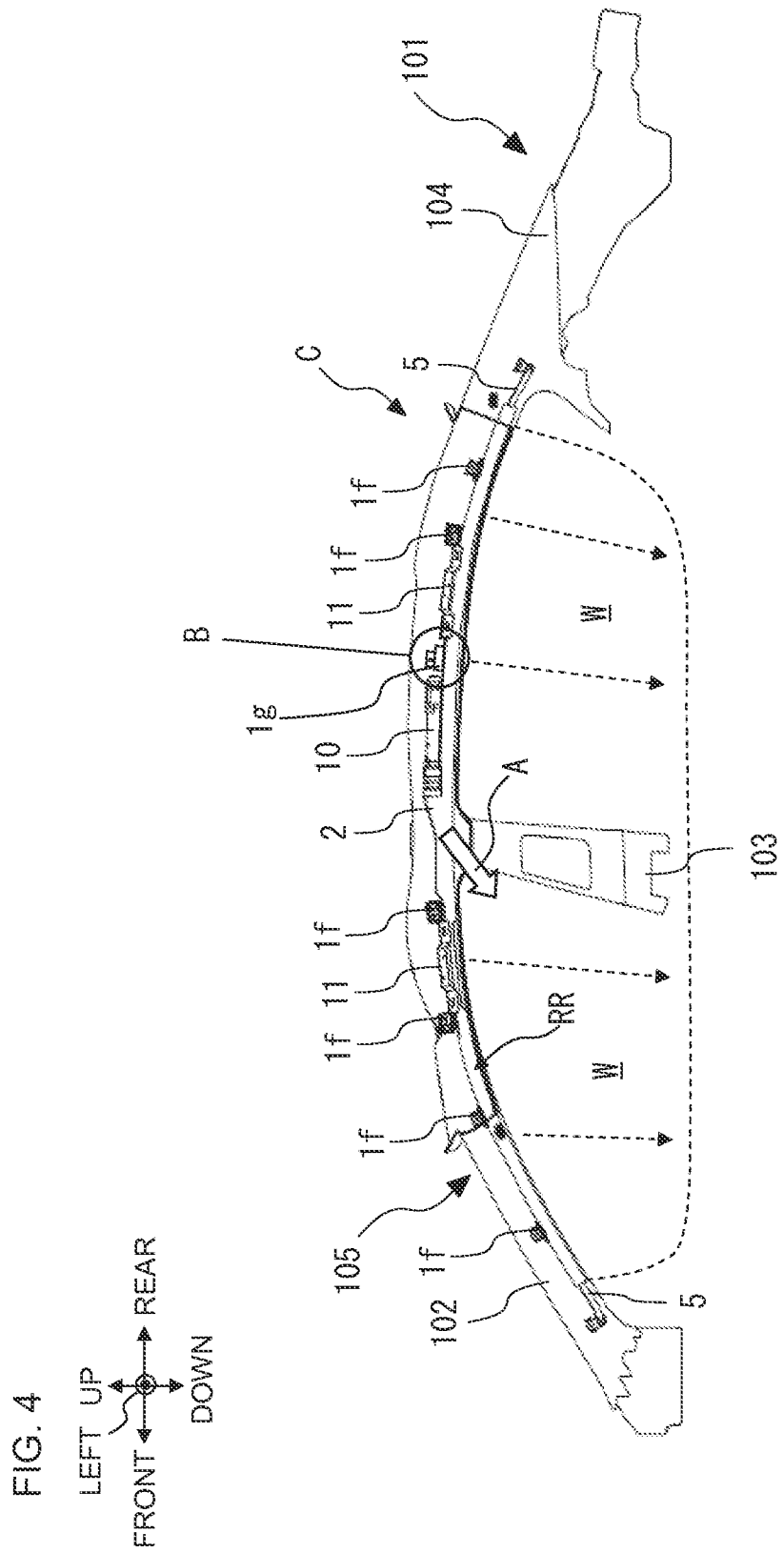
FIG. 4 is a side view, from the vehicle interior, of a curtain airbag apparatus when mounted on the vehicle body.

FIG. 3 is an external view of the airbag body 1 when attached to the vehicle body 101. FIG. 4 is a side view, from the vehicle interior, of the curtain airbag apparatus when mounted on the vehicle body 101.

As shown in FIGS. 3 and 4, the airbag body 1 is arcuately shaped so as to conform to the state (see FIG. 4) of attachment to and housing into the vehicle body 101. The introducing portion 2 is fitted with an inflator 10 that is of a generally substantially cylindrical shape. The inflator 10 is fitted to the introducing portion 2 in an orientation substantially parallel to the vehicle body longitudinal direction along the vehicle body shape so as to reduce the capacity to house the inflator 10. Metal fittings 11, etc., are fitted to the upper edge 1a depending on the shape and the structure of the vehicle body 101. A curtain airbag apparatus generally designated by C is configured from the inflator 10 and the curtain airbag 100 (the roll RR in the diagrams) including the airbag body 1, the attachment tabs 1f, 1g, and the tethers 5.

The curtain airbag apparatus C is arcuately disposed on a roof side rail generally designated by 105 that extends from a front pillar 102 through a center pillar 103 up to a rear pillar 104. The curtain airbag apparatus C is firmly fixed to the vehicle body 101 by locking the attachment tabs 1f, 1g and the tethers 5 to the brackets, etc., disposed on the vehicle body 101. Among the attachment tabs 1f, 1g of this embodiment, a heavy-duty attachment tab 1g positioned immediately rearward of the introducing portion 2 has a special locking structure for improving the durability in particular. This locking structure will be described in detail later with reference to FIG. 6.

The inflator 10 is controlled by an inflator control circuit not shown that detects a collision to send an ignition signal to the inflator 10. When the inflator 10 is actuated by the inflator control circuit, pressure gas is injected into the interior of the airbag body 1.

Figure 5:
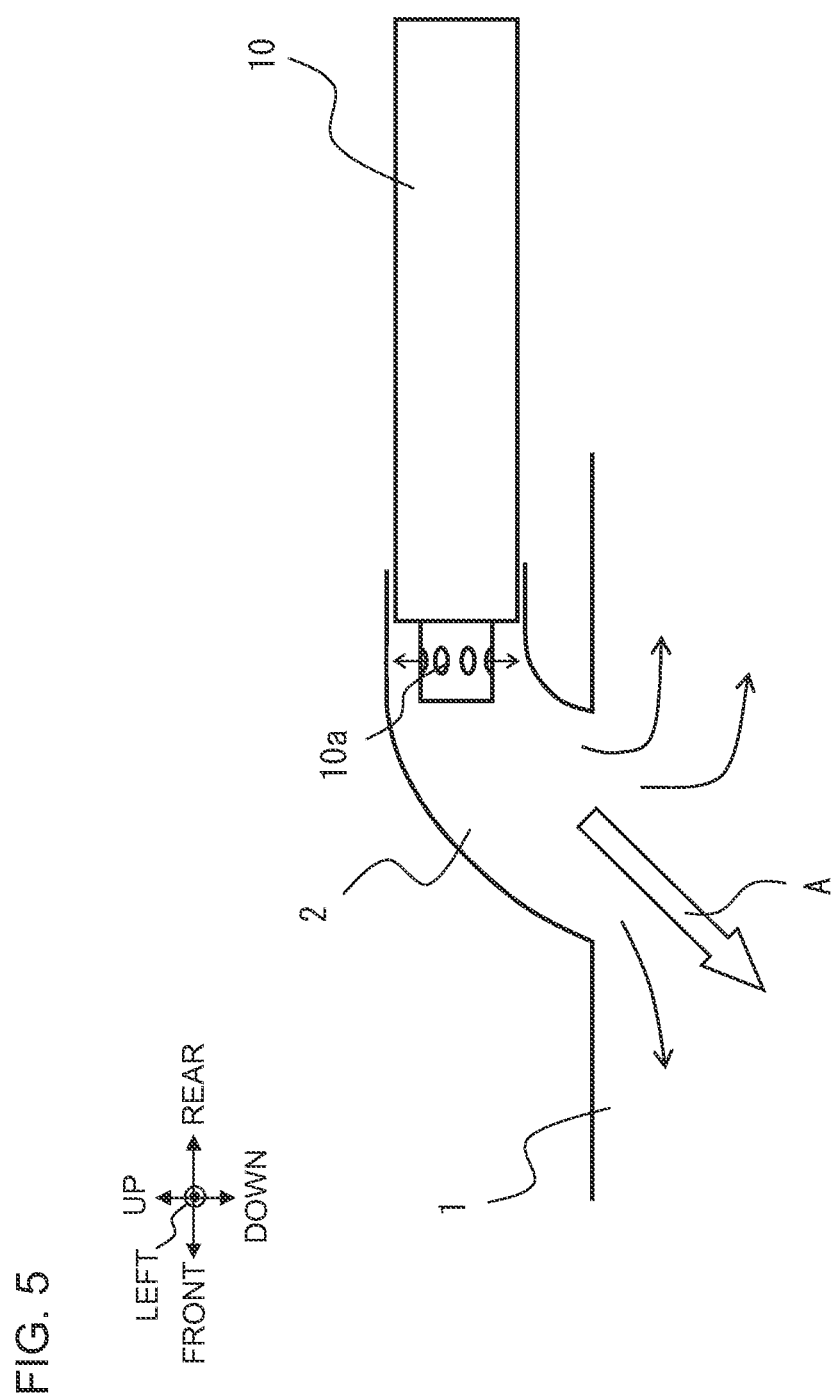
FIG. 5 is an opened-up view showing the interior of an introducing portion and its vicinity.

FIG. 5 is an opened-up view showing the interior of the introducing portion 2 and its vicinity. The inflator 10 is disposed in an orientation substantially parallel to the vehicle body longitudinal direction as described above. The inflator 10 has at its front end a plurality of gas injection ports 10a and is inserted at its front end into the interior of the introducing portion 2. The plurality of gas injection ports 10a open toward the direction (i.e., the radial direction of the inflator 10) orthogonal to the vehicle body longitudinal direction and therefore inject pressure gas radially around the inflator 10 when the inflator 10 is in operation. The radially injected pressure gas is gathered within the introducing portion 2 having a reduced diameter to be directed toward the interior of the airbag body 1 positioned therebelow. The pressure gas then diffuses through the interior of the airbag body 1 to the front and the rear of the vehicle body 101. As a result, however, most of the radially injected pressure gas is injected at an angle slanted diagonally frontward and downward of the vehicle body 101 that is the introduction direction of the introducing portion 2 (see arrow A of FIGS. 4 and 5).

Due to the introduction of the pressure gas, the airbag body 1 is released from the rolled-up status in the form of the roll RR to allow its lower end 1*b* to inflate and deploy downward of the vehicle body 101 (see broken lines of FIG. 5). In consequence, the airbag body 1 extends downward of the vehicle body 101 in such a manner as to enter spaces between the passengers and side windows W (see FIG. 4) and swells therebetween, thus restraining the passengers.

Figure 6:
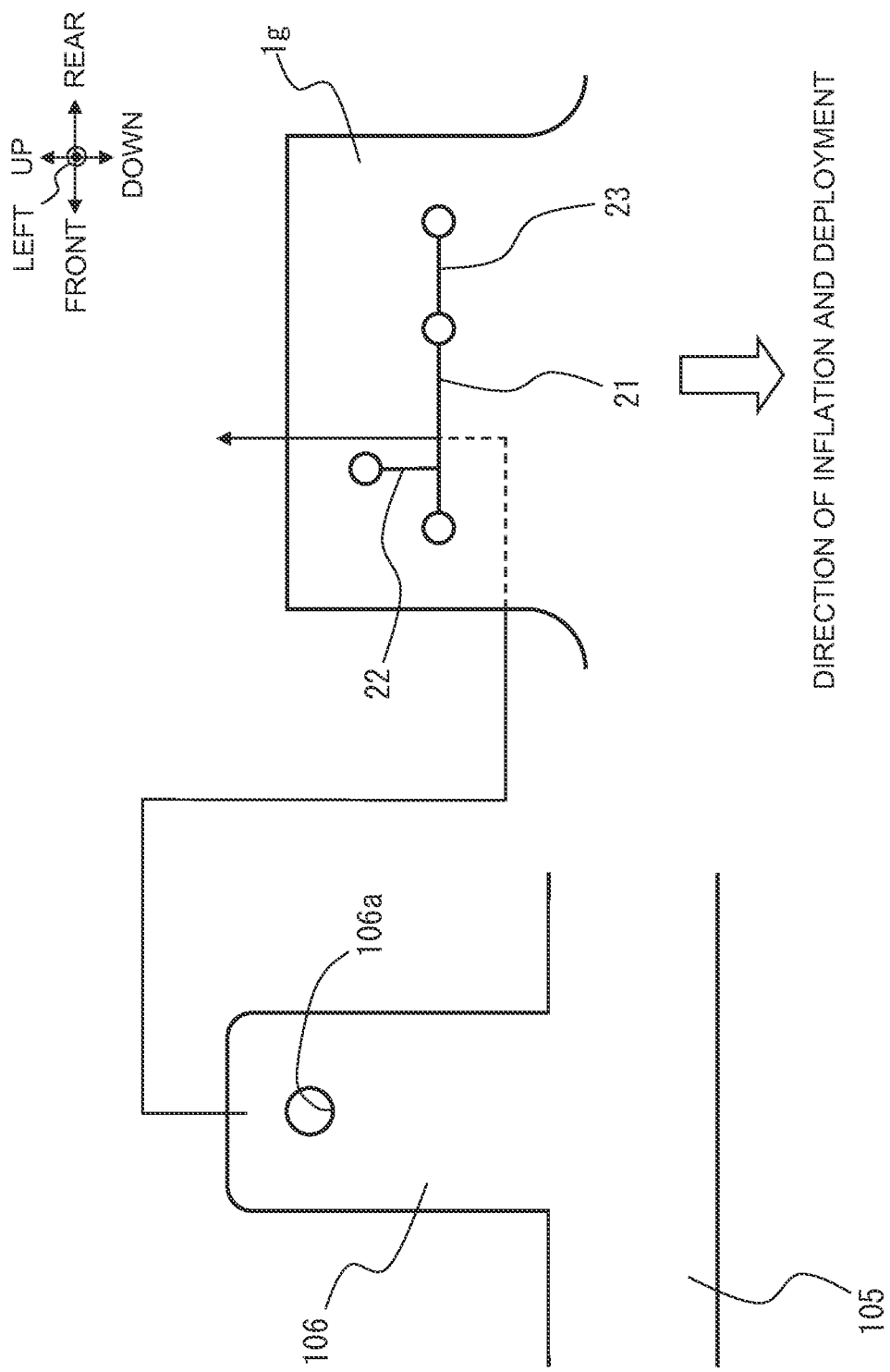
FIG. 6 is an external view of the structure of locking between a heavy-duty attachment tab and a bracket disposed on the vehicle body, FIG. 6 being also an enlarged exploded view of an area B of FIG. 4.

FIG. 6 is an external view of the structure of locking between the heavy-duty attachment tab 1*g* and the bracket 106 disposed on the vehicle body 101. FIG. 6 is also an enlarged exploded view of an area B of FIG. 4. In FIG. 6, the bracket 106 is a substantially rectangular flat-plate structural member projecting upward from the roof side rail 105 (see FIG. 4). The bracket 106 has at its extremity a bolt insertion hole 106*a* that receives a bolt for fastening to the vehicle body 101. The flat plate portion of the bracket 106 may be limited to a portion inserted into a first slit of the heavy-duty attachment tab 1*g* which will be described later. The remaining portions may bend along the vehicle body shape. The heavy-duty attachment tab 1*g* is a part (whose seam lines are not shown in particular) obtained by sewing a plurality of substantially rectangular base fabrics in layers. The heavy-duty attachment tab 1*g* has the first slit designated by 21, a second slit 22, and a third slit 23 that are formed substantially at the center portion thereof. This heavy-duty attachment tab corresponds to a tab defined in claims.

When viewing the heavy-duty attachment tab 1*g* in plan, the first slit 21 extends in the vehicle body longitudinal direction, i.e., in the direction substantially orthogonal to the direction (downward in FIG. 6) of inflation and deployment d of the curtain airbag 100 so that the bracket 106 is inserted therethrough in the normal time. The second slit 22 opens and extends upward (i.e., in a direction opposite to the direction of inflation and deployment) at a right angle from a point on an intermediate portion of the first slit 21 closer to the vehicle body front. As used herein, "closer to the vehicle body front" refers to "frontward of a midpoint of the first slit 21 in the vehicle body longitudinal direction". The third slit 23 extends in a direction extended from one end of the first slit 21 closer to the vehicle body rear. The slits 21, 22, and 23 have end holes, respectively, disposed at their respective ends. The second slit 22, however, has no end hole at one end opening into the first slit 21.

The bracket 106 is inserted into the first slit 21 from below outward of (rightward of) the vehicle body relative to the heavy-duty attachment tab 1*g* such that the extremity of the bracket 106 protrudes upward. The bracket 106 thus locks the heavy-duty attachment tab 1*g* as shown in a perspective view of FIG. 7. In the normal time during which the curtain airbag 100 is neither inflated nor deployed, the heavy-duty attachment tab 1*g* bends outward of the vehicle body with the bracket 106 being disposed in the first slit 21. In this state, together with the roll RR, the heavy-duty attachment tab 1*g* is fastened to the roof side rail 105 by winding a breaking tape therearound (not shown). When actuating the inflator 10 to inject pressure gas, the breaking tape is broken, allowing the curtain airbag 100 to inflate and deploy. At this time, the heavy-duty attachment tab 1*g* locked to the bracket 106 supports the upper edge 1*a* of the airbag body 1 that is deploying downward.

As described above, however, pressure gas from the inflator 10 is injected diagonally frontward and downward of the vehicle body into the interior of the airbag body 1. Since the heavy-duty attachment tab 1*g* is positioned immediately posterior to the inflator 10, it is subjected also to a load I that is a component directed frontward of the vehicle body. To support the upper edge 1*a* of the airbag body 1 by this heavy-duty attachment tab 1*g*, there is needed a durability enough to receive a large diagonally frontward and downward load K obtained by combining the vehicle body frontward load component I and a downward load component J arising from the inflation and deployment of the airbag body 1.

Figure 7:
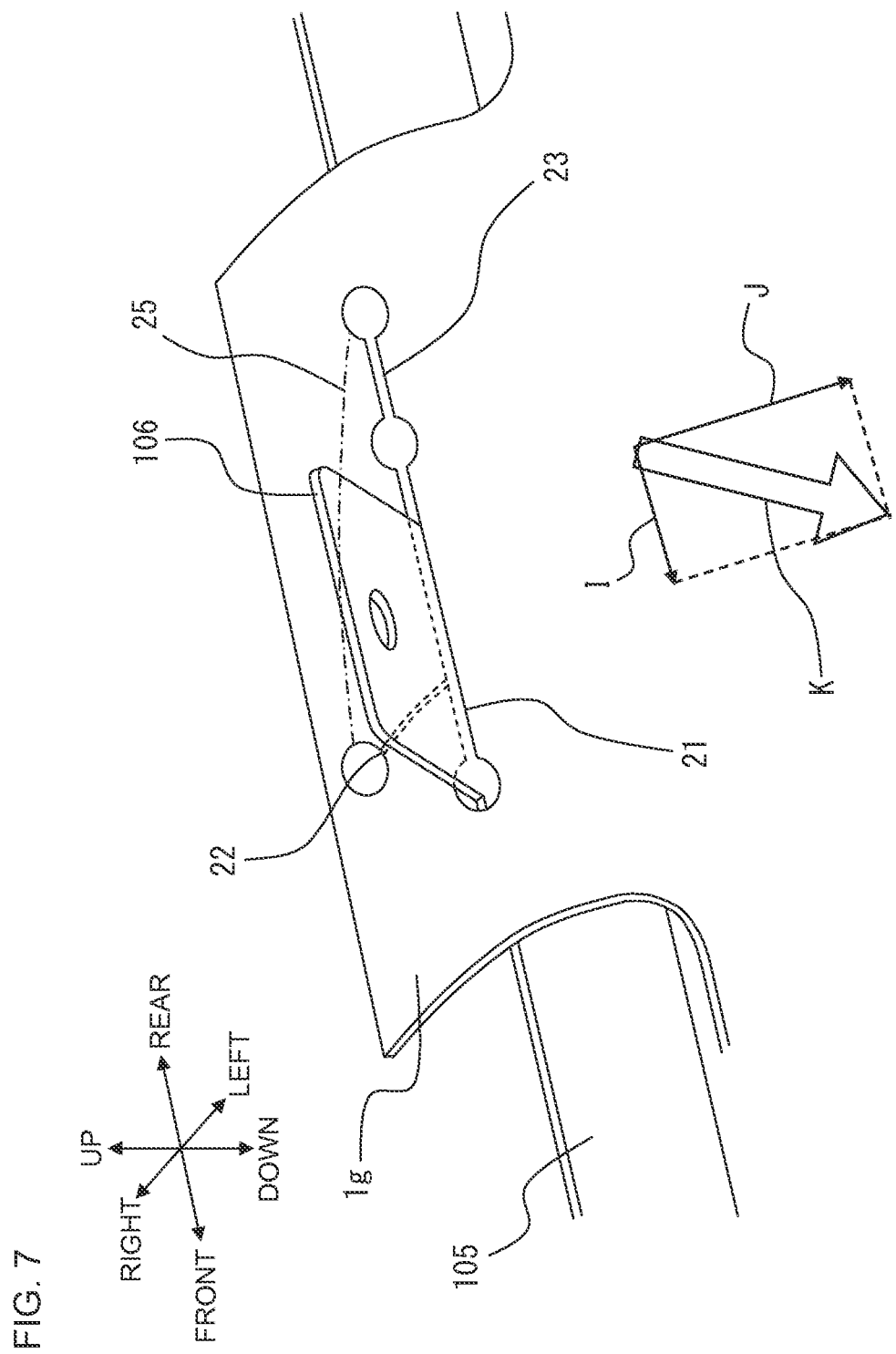
FIG. 7 is a perspective view, showing an external appearance, of the structure of locking between the heavy-duty attachment tab and the bracket disposed on the vehicle body.
Figure 8:
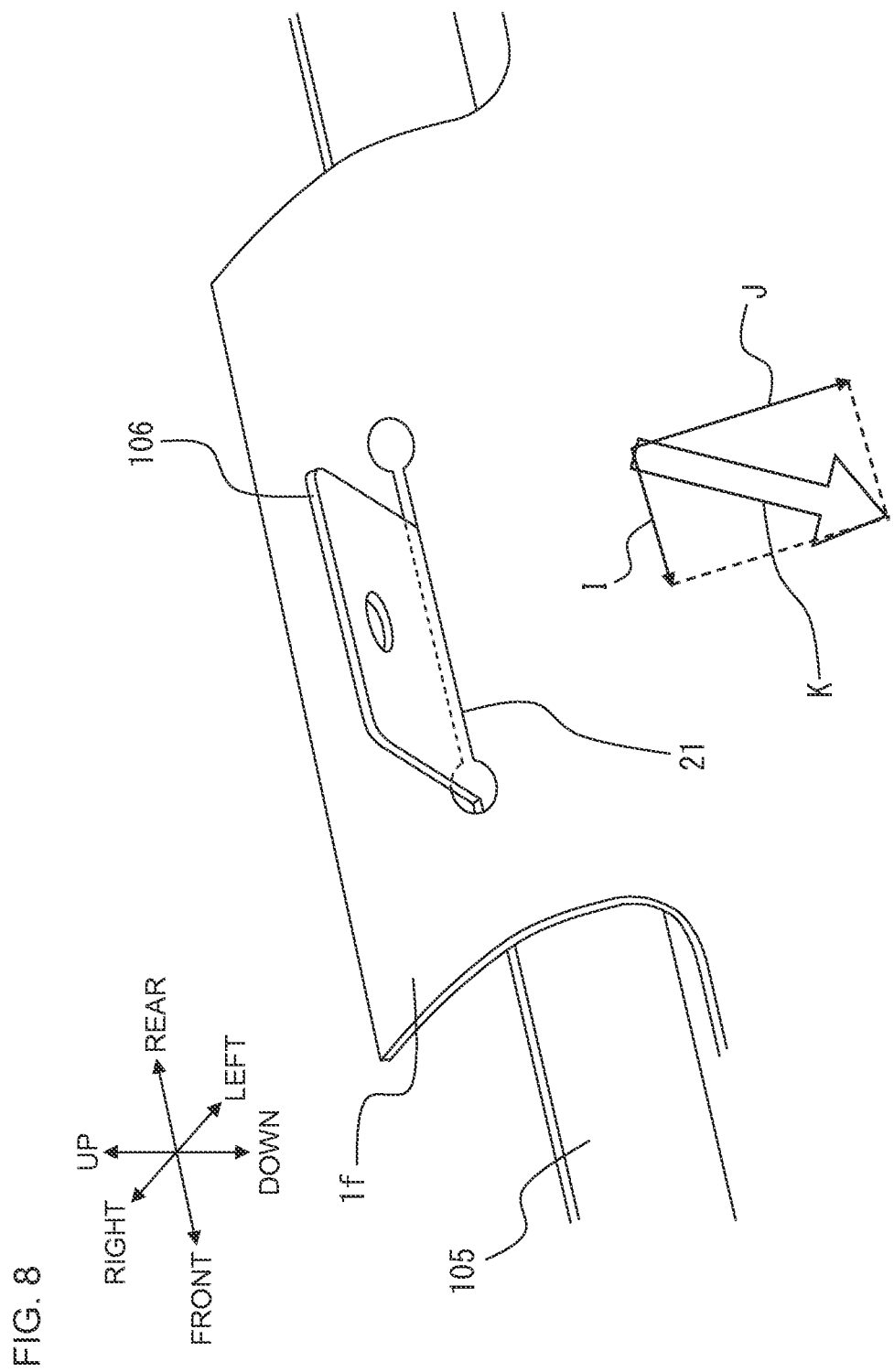
FIG. 8 is a perspective view, showing an external appearance, of the structure of locking between an attachment tab having only a first slit and the bracket disposed on the vehicle body.

As a comparison example, the locking structure of an attachment tab 1*f* having only the first slit 21 is shown in a perspective view of FIG. 8 corresponding to FIG. 7. If the diagonally frontward and downward combined load K is applied to the attachment tab 1*f*, there may appear a break extending diagonally rearward and upward of the attachment tab 1*f* as shown in FIG. 9. This is because the airbag body 1 and the attachment tab 1*f* are drawn in diagonally frontward and downward by the combined load K so that the rear edge of the bracket 106 abuts against the inner periphery of the end hole at a rear end of the first slit 21. As a result, the base fabrics cannot bear an excess stress concentrated on the abutted point and break open. At that time, a break line 24 runs diagonally rearward and upward.

On the contrary, the heavy-duty attachment tab 1*g* of this embodiment does not undergo the occurrence of a break as shown in FIG. 10 even when the diagonally frontward and downward combined load K is similarly applied thereto. The reason is that, when the heavy-duty attachment tab 1*g* is drawn in diagonally frontward and downward by the combined load K, portions of the base fabrics are turned up (or turned down) below a bend line 25 (see a dashed dotted line of FIG. 7) extending from the end hole at the upper end of the second slit 22 up to the end hole at the rear end of the third slit 23 so that the whole of wrinkles of the base fabrics created therearound receives the rear edge of the bracket 106. These wrinkles are formed diagonally rearward and upward of the heavy-duty attachment tab 1*g* such that the base fabrics become multi-layered. When the face of the turned-up portions of the base fabrics receives the rear edge of the bracket 106, the stress can be distributed over all the wrinkles. Locking with a higher durability can thus be implemented.

This embodiment configured as above achieves the following operation effects.

In the airbag body 1 of this embodiment, the heavy-duty attachment tab 1*g* has the first slit 21 into which the bracket 106 is inserted in the normal time. The first slit 21 extends in a direction orthogonal to the direction of inflation and deployment of the airbag body 1. The second slit 22 opens and extends at a right angle from a point on an intermediate portion of the first slit 21 closer to the vehicle body front. Hence, an end opposite to the opening side of the second slit 22 is apart from the first slit 21. When the heavy-duty attachment tab 1*g* is drawn in diagonally frontward and downward by the combined load K as shown in FIG. 10, portions of the base fabrics are turned up (or turned down) below the bend line 25 extending from the end (the opposite end to the opening side) of the second slit 22 up to the rear end of the first slit 21 (in this embodiment, the rear end of the third slit 23). When the face of the turned-up portions of the base fabrics receives the rear edge of the bracket 106, the stress can be distributed over all the wrinkles appearing therearound. In this manner, the heavy-duty attachment tab 1g implements a higher durability by only the arrangement of the slits in the base fabrics. As a result, the tab durability can be improved without disposing the reinforcement fabrics.

In this embodiment in particular, the second slit 22 extends from the first slit 21 toward the opposite side (i.e., upward) to the direction of inflation and deployment. This enables the bend line 25 to be disposed in the opposite side to the side of application of the combined load K with respect to the first slit 21 so that wrinkles of base fabrics to receive the rear edge of the bracket 106 can be created therearound.

In this embodiment in particular, the second slit 22 opens into the first slit 21 at a point anterior to the middle of the first slit 21 in the longitudinal direction, i.e., at a point closer to the side of application of the load component Ito the heavy-duty attachment tab 1g along the direction of extension of the first slit 21 at the time of inflation and deployment of the airbag body 1. This enables the bend line 25 opposite to the application side of the combined load K to be set longer. Wrinkles appearing therearound can thus be formed wider correspondingly to improve the durability of the heavy-duty attachment tab 1g.

In this embodiment in particular, the first slit 21 is extended into the third slit 23 on the posterior side to the range of insertion of the bracket 106 in the normal time, i.e., on the opposite side to the side of application of the load component Ito the heavy-duty attachment tab 1g along the direction of extension of the first slit 21 at the time of inflation and deployment of the airbag body 1. This enables the bend line 25 opposite to the application side of the combined load K to be set longer. Wrinkles appearing therearound can thus be formed wider correspondingly to improve the durability of the heavy-duty attachment tab 1g.

Figure 11A:
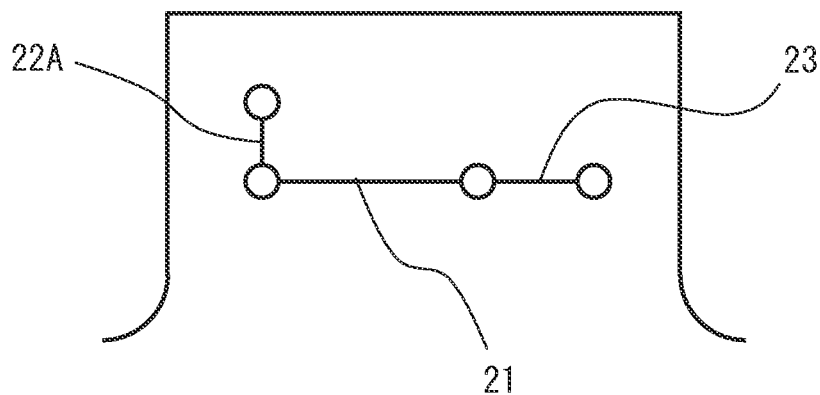
FIG. 11A is a view showing a modification example of the heavy-duty attachment tab.

Although in the embodiment the second slit 22 opens at an intermediate portion of the first slit 21, the present invention is not limited thereto. The opening position of the second slit 22 is required, at least, to be closer to the side of application of the combined load. As shown in FIG. 11A, a second slit 22A may be disposed in such a manner as to open at the front end of the first slit 21. In this case, the bend line 25 opposite to the application side of the combined load K can be set even longer, with the result that wrinkles appearing therearound can be formed even wider correspondingly to improve the durability of the heavy-duty attachment tab 1g.

Figure 11B:
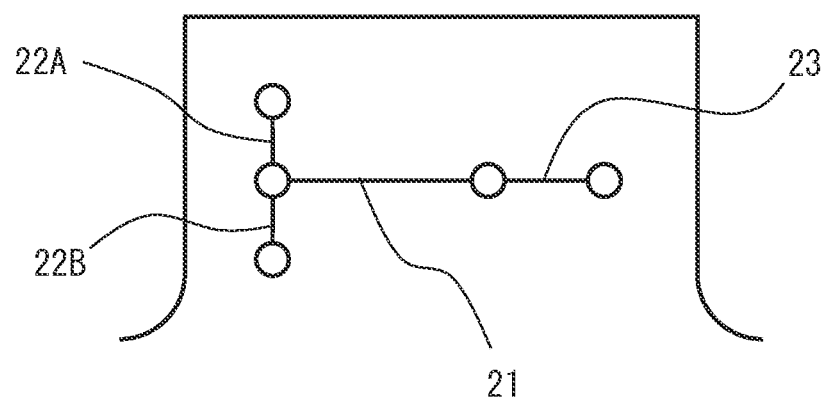
FIG. 11B is a view showing another modification example of the heavy-duty attachment tab.

Although in the embodiment the second slit 22 is disposed only upward from the first slit 21, the present invention is not limited thereto. The second slit 22 is required, at least, to be disposed on the side opposite to the direction of inflation and deployment. For example, a second slit 22b may be disposed downward from the first slit 21 as shown in FIG. 11B. In this case as well, the base fabrics can have wrinkles capable of receiving the rear edge of the bracket 106.

Figure 11C:
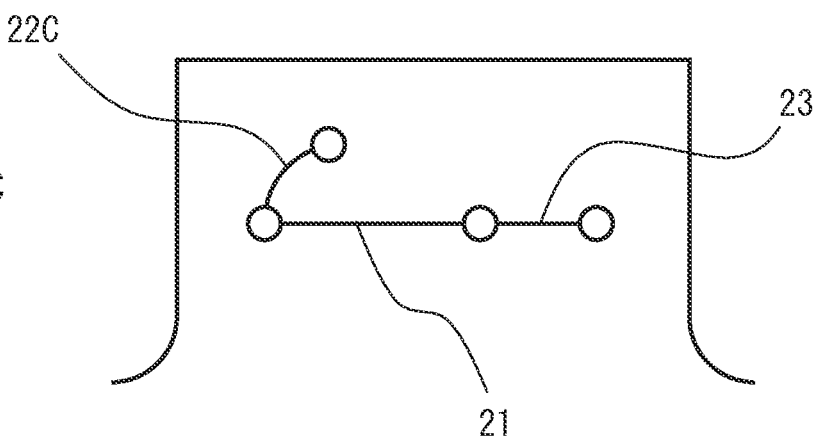
FIG. 11C is a view showing a further modification example of the heavy-duty attachment tab.

Although in the embodiment the second slit 22 is rectilinearly disposed at an angle orthogonal to the first slit 21, the present invention is not limited thereto. For example, a second slit 22C may be disposed in a curved shape such as a substantially arc shape as shown in FIG. 11C. Although not shown, the second slit 22C may open into the first slit 21 at an acute angle or at an obtuse angle. In this case as well, the base fabrics can have wrinkles capable of receiving the rear edge of the bracket 106.

Although the above description has been given of the case by way of example where the present invention is applied to the so-called curtain airbag mounted on the sides of a vehicle body, the present invention is not limited thereto. The present invention is otherwise applicable to another airbag apparatus in which a load component is applied in a direction orthogonal to the direction of inflation and deployment of the airbag body.

Other than the above, techniques of the embodiment and the modification example may properly be combined for use.

Although not exemplified one by one, the present invention may variously be modified and embodied without departing from the spirit thereof.

What is claimed is:

1. An airbag comprising:
   a tab that is inserted into and supported by a substantially flat-plate-shaped bracket disposed on a vehicle,
   said tab having, in plan view,
   a first slit extending along a direction substantially orthogonal to a direction of inflation and deployment of said airbag, and allowing insertion of said bracket in a normal time, and
   a second slit that opens into a point at one end portion or on an intermediate portion of said first slit at an angle intersecting with said first slit.

2. The airbag according to claim 1, wherein
   said second slit extends at least on a side opposite to said direction of inflation and deployment with respect to said first slit.

3. The airbag according to claim 1, wherein
   said second slit opens into said first slit at a point closer to a side of application of a load component to said tab along a direction of extension of said first slit at the time of inflation and deployment of said airbag.

4. The airbag according to claim 1, wherein
   said first slit includes a third slit that extends from a range of insertion of said bracket in the normal time towards a side opposite to said side of application of a load component to said tab along said direction of extension of said first slit at said time of inflation and deployment of said airbag.

5. An airbag apparatus comprising:
   the airbag according to claim 1; and
   an inflator that supplies gas for inflation and deployment of said airbag into said interior of said airbag.

* * * * *